United States Patent
Schlaff

[19]

[11] Patent Number: 5,940,486
[45] Date of Patent: Aug. 17, 1999

[54] TWO-WAY COMMUNICATION SYSTEM WITH SELECTIVE MUTING

[75] Inventor: Steven Schlaff, Woodsburgh, N.Y.

[73] Assignee: Norcon Communication, Inc., Inwood, N.Y.

[21] Appl. No.: 08/607,437

[22] Filed: Feb. 27, 1996

[51] Int. Cl.⁶ .................................................. H04M 1/60
[52] U.S. Cl. ........................ 379/167; 379/389; 379/390; 381/57; 381/110
[58] Field of Search ...................................... 379/167, 392, 379/387, 388, 389, 390; 381/56, 86, 92, 94, 71, 110, 57, 71.5, 94.2

[56] References Cited

U.S. PATENT DOCUMENTS

| | | |
|---|---|---|
| 3,215,780 | 11/1965 | Beszedics et al. . |
| 3,291,911 | 12/1966 | McCullough . |
| 3,999,015 | 12/1976 | Snyder et al. . |
| 4,049,911 | 9/1977 | Schlaff et al. . |
| 4,308,427 | 12/1981 | Danford . |
| 4,319,086 | 3/1982 | Thompson . |
| 4,588,859 | 5/1986 | Liberman . |
| 4,600,815 | 7/1986 | Horna . |
| 4,625,083 | 11/1986 | Poikela ..................................... 379/389 |
| 4,691,348 | 9/1987 | Braathen . |
| 4,764,954 | 8/1988 | Tsurusaki et al. ....................... 379/390 |
| 5,138,656 | 8/1992 | Shanes ....................................... 379/167 |
| 5,235,637 | 8/1993 | Kraz et al. ................................ 379/390 |
| 5,243,659 | 9/1993 | Stafford et al. ............................. 381/86 |
| 5,297,198 | 3/1994 | Butani et al. ............................... 381/57 |
| 5,563,952 | 10/1996 | Mercer ....................................... 381/94 |
| 5,612,996 | 3/1997 | Li .............................................. 379/390 |
| 5,615,256 | 3/1997 | Yamashita .................................. 381/57 |
| 5,657,384 | 8/1997 | Staudacher et al. ...................... 379/388 |

FOREIGN PATENT DOCUMENTS 63-48937  3/1988  Japan .

*Primary Examiner*—Curtis A. Kuntz
*Assistant Examiner*—Binh K. Tieu
*Attorney, Agent, or Firm*—Gottlieb, Rackman & Reisman, P.C.

[57] ABSTRACT

A bidirectional communication channel provides communication across a sound proof wall used, for example in a ticket booth. Normally communication from outside into the booth is muted by inhibiting the gain of a listen channel to a preselected percentage of its maximum gain level. After an attendant talks into an internal microphone, the muting is temporarily inhibited and normal communication is allowed between an attendant and a customer. After the conversation is completed, the system reverts back to a muted operational mode.

16 Claims, 2 Drawing Sheets

TWO-WAY COMMUNICATION SYSTEM WITH SELECTIVE MUTING

BACKGROUND OF THE INVENTION

A. Field of Invention

This invention pertains to talk-through units, and more particularly to a talk through unit in which speech is automatically muted at least in one direction, and restored in response to voice signals in the opposite direction.

B. Description of the Prior Art

In many instances it is desirable to provide a two-way communication system for bridging a partition. For example, many ticket booths used for dispensing tickets at train stations, theaters, sporting arenas and so forth are provided with bullet proof windows for the protection of the attendant. Communication between a potential customer and the attendant is provided by a two way talk unit, such as as described in commonly assigned U.S. Pat. No. 4,049,911, incorporated herein by reference. The unit described in this reference, is preferably mounted on the window partition and includes two sets of speakers and microphones. An external microphone is used to pick up sounds from the customer and transmit them to an internal speaker. An internal microphone, preferably disposed on a flexible extension, referred to as the "goose-neck", transmits the sounds from the attendant to an external speaker. Control circuitry is provided to selectively amplify the sounds in both directions. More specifically, sounds from inside the booth are not picked up and transmitted unless the attendant speaks within a short distance, i.e., two inches, from the internal microphone. External sounds are compressed so that they are reproduced at a preselected constant maximum amplitude.

A problem with this system is that sudden loud background external noises, such as generated for example by a large crowd at a sports arena, or by a train in a train station, are propagated indiscriminately into the booth, and can be discomforting to the attendant, especially over long time periods.

Other two way communication systems are known in the art. For example, U.S. Pat. No. 3,291,911 discloses a system wherein one of the two way channels is partially muted when not in use. The channel automatically turns off its own muting when it receives an input signal. U.S. Pat. No. 4,588,859 a two channel system is disclosed wherein each channel mutes the other channel when receiving an input signal.

Japanese Patent 63-48937 discloses a muting circuit in a telephone system with a predetermined time delay.

The following references also disclose other communication schemes: 3215780; 3999015; 43084278; 4319086; 4691348.

None of these schemes solve the abovementioned problems satisfactorily.

OBJECTIVES AND SUMMARY OF THE INVENTION

In view of the above-mentioned disadvantages of the prior art, it is an objective of the present invention to provide a two channel communication system wherein external background noises are automatically reduced to eliminate discomfort to the attendant.

A further objective is to provide a system which can be readily implemented by modifying an existing system thereby reducing design costs.

Other objectives and advantages of the invention shall become apparent from the following description.

Briefly, a communication system constructed in accordance with this invention provides two channels: a listen channel for transmitting external sounds into the booth, and a talk channel for transmitting sounds from the attendant in the booth to a potential customer outside the booth. Importantly, the listen channel is partially muted so that it transmit sounds at a fraction of its maximum amplitude, such as 30%. In this manner, the attendant is protected from sudden loud external background noises. When a customer approaches the booth, the attendant speaks into the internal mike, causing the muting to be disabled. This action defeats the muting of the listen channel for a preselected time duration, i.e., 30 seconds. During this time, the sounds uttered by the customer are amplified at full amplitude and reproduced in the booth so that normal communication can take place between the customer and the attendant.

DETAILED DESCRIPTION OF THE INVENTION

Figure 1:
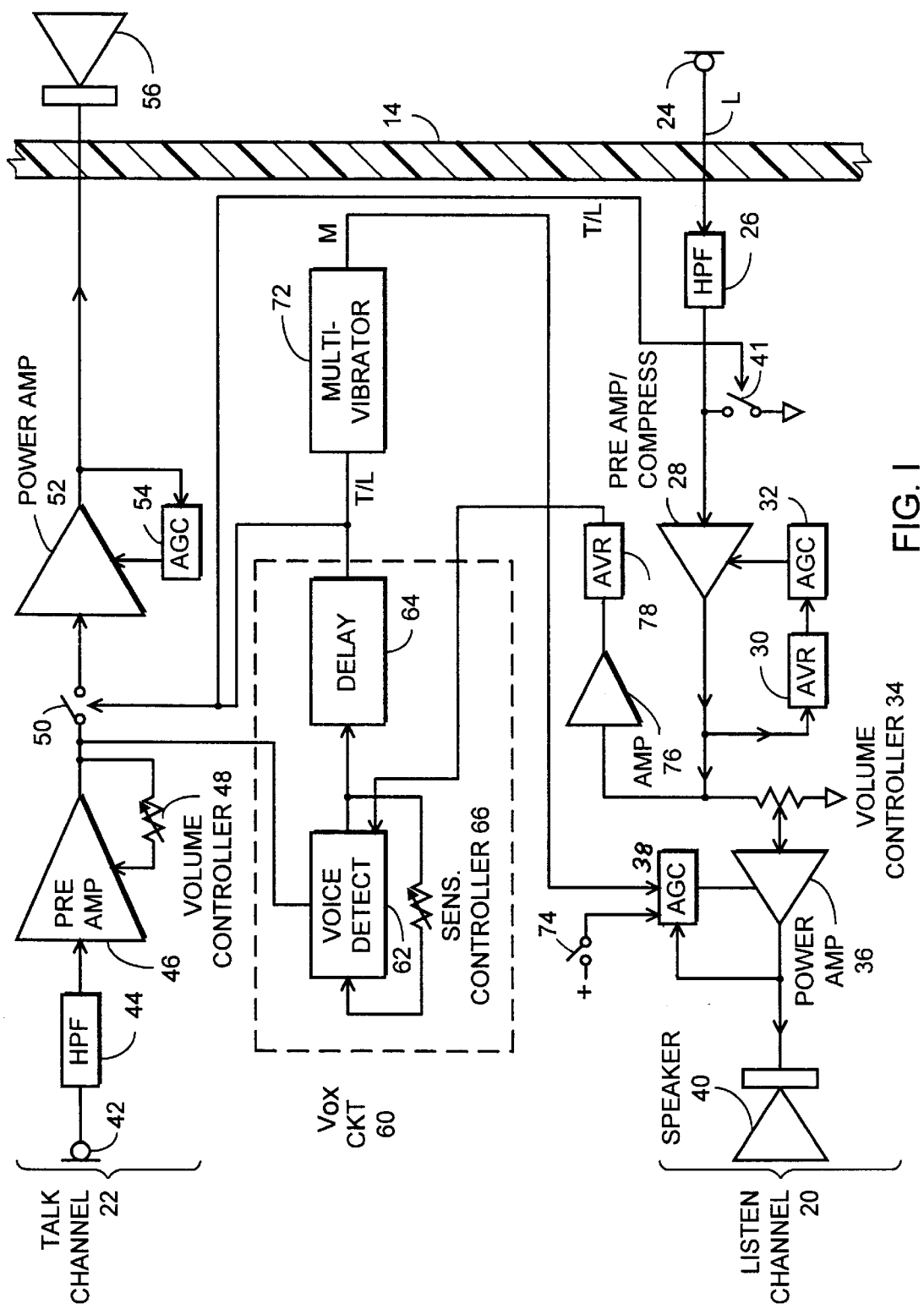
FIG. 1 shows a block diagram of a communication system constructed in accordance with this invention.

A communication system 10 constructed in accordance with this invention is shown in FIG. 1. This system 10 is a two way audio system that provides personal communication between people separated by a sound-proof barrier 14. The system consists of two channels: a listen channel 20 and a talk channel 22. The listen channel 20 consists of an electret microphone 24, disposed outside the barrier 14. The signals from the microphone 24 are fed to a high pass filter 26 and then to a preamplifier 28. The output of the preamplifier 28 is fed to an averaging circuit 30. The averaging circuit 30 takes an average of the preamplifier output and feeds it to a gain control circuit 32 which controls the gain of preamplifier 28. In this manner the pre-amplifier 28 performs an amplification function and in addition, together with the averaging circuit 30 and the automatic gain control circuit 32 compresses and limits the signals from the microphone 24 to a preselected range.

The signals from amplifier 28 are also fed to a volume controller 34, which may be for example a variable resistor. The signals from the volume controller 34 are fed to a power amplifier 36. The gain of power amplifier 36 is controlled by an automatic gain controller 38. The output of power amplifier 36 is fed to an internal speaker 40, as described below.

The listen channel 20 can be disabled by an electronic switch 41 as discussed below, by grounding the output at filter 26.

The talk circuit 22 includes an internal microphone 42, preferably mounted on a relatively stiff armored cable assembly, commonly called a 'goose-neck' (not shown). The signals from the microphone 42 are filtered by high-pass filter 44 and then amplified by preamplifier 46. The gain of the preamplifier 46 is controlled through a volume controller 48. The output of the preamplifier 46 is fed through an electronic switch 50 to a power amplifier 52. The gain of amplifier 52 is controlled by an automatic gain controller 54. The output of the amplifier is fed through barriers 14 to an external speaker 56.

The system 10 further includes a VOX circuit 60 consisting of a voice detect circuit 62 and a 200 msec delay circuit 64. The sensitivity of voice detect circuit 62 is controlled through a sensitivity controller 66. The voice detect circuit 62 is used to detect signal T from preamplifier 46 having an amplitude exceeding a preselected threshold set by sensitivity controller 66. The delay circuit generates a signal T/L which goes high substantially when signal T exceeds the threshold and stays high for a predetermined time (i.e., 200 msec) after the signal T falls below the threshold.

The system 10 is further provided with a muting control circuit consisting of a one-shot multivibrator 72 triggered by the T/L signal. The multivibrator 72 generates a signal M of preselected duration (for example, 30 seconds) after the T/L signal goes low. This signal M is used to control AGC 38.

A manual mute switch 74 is also provided to control the automatic gain controller 38, as discussed below.

The signal T/L is used to control switches 50 and 71.

In order to eliminate cross-talk, the system is further provided with an amplifier 76 and an average determining circuit 78. Signals from the preamplifier 28 are amplified by amplifier 76 and averaged by circuit 78. If this output of circuit 76 exceeds a predetermine threshold, the signal from circuit 76 is used to disable the voice detect circuit 62.

Figure 2:
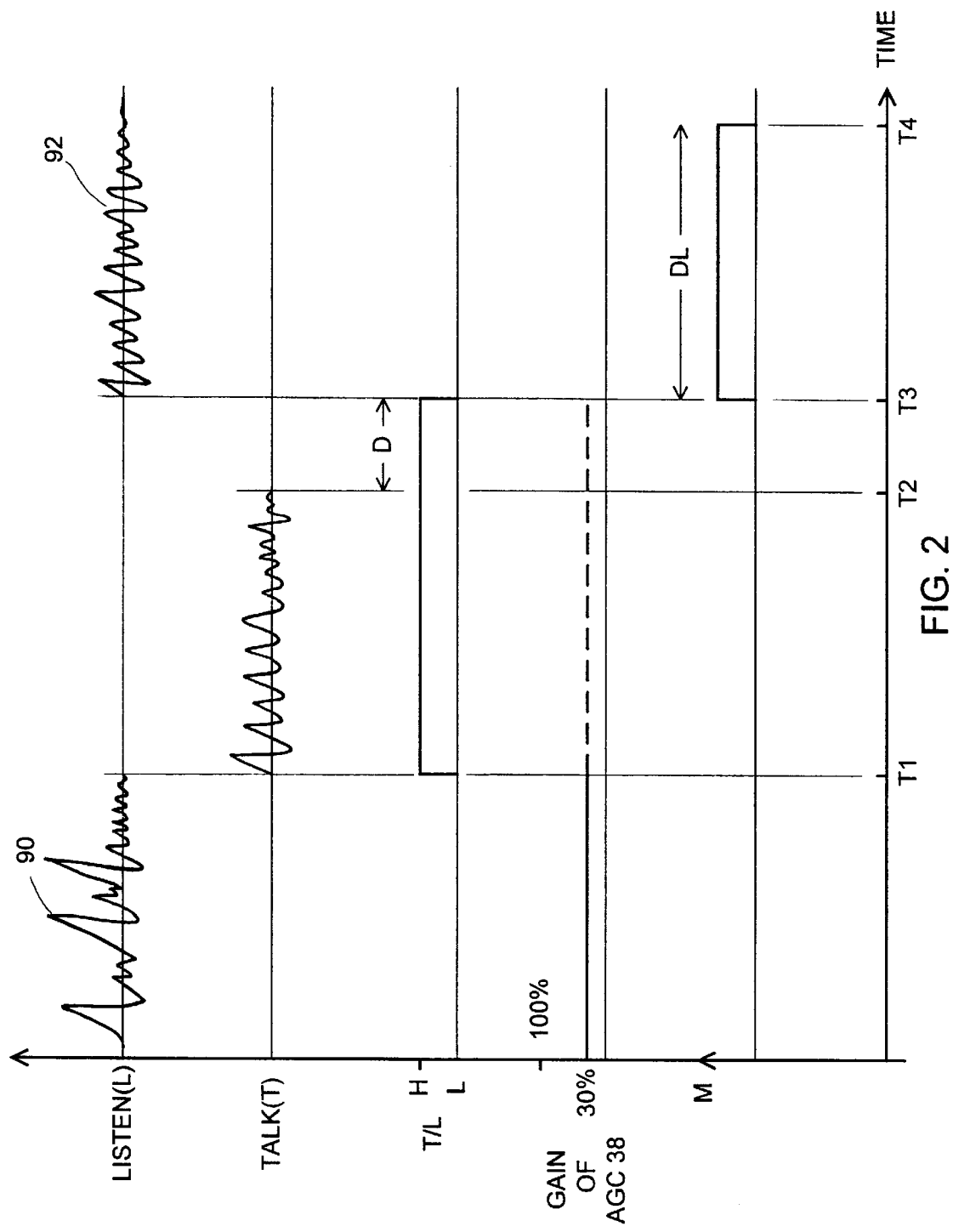
FIG. 2 shows a timing diagram indicating the various modes of operation and the corresponding signals occurring in the system of FIG. 1.

The operation of the system 10 shall now be explained in conjunction with FIG. 2. Initially, the system 10 is in a quiescent mode. In this mode, assuming that the manual mute switch 74 is open the signal M from the multivibrator 72 is low, and the gain controller 38 is set to adjust the gain of amplifier 36 to about 30% of its maximum output. Thus, any loud ambient noises (indicated in FIG. 2 by dotted line 90) picked up by microphone 24 are automatically muted so that they will not interfere with the attendant inside the booth. Signal T is low and the voice detect circuit 62 keeps switch 50 open through signal T/L, unless the attendant talks directly into microphone 42. This feature permits, for example, an attendant to listen to a radio, talk on the telephone or talk to another person in the booth in privacy.

At t=T1, a customer approaches the booth and the attendant inside the booth leans toward the microphone 42 and says something (for example 'May I help you?') to switch the system 10 to the talk mode. At the beginning of this mode, the sounds from the attendant are sensed by voice detector 62, which in response causes the output of the voice detector 62 to go high. This output remains high as long as voice signal T is detected. The output of detector 62 is fed to delay circuit 64 which in response generates signal T/L as shown in FIG. 2. Signal T/L is high while the output of detector 62 is high and is used to close electronic switches 41 and 50 thereby enabling the talk channel 22 and disabling the listen channel 20. The voice signals from preamplifier 46 are amplified by amplifier 52 and reproduced by speaker 56. While the attendant is speaking, the listen channel 20 is therefore off.

At t=T2 the attendant stops talking, however, the signal T/L remains high until t=T3 due to delay circuit 62. The delay circuit 62 is used to insure that the talk channel 22 is not disabled while the attendant is talking. Its delay is selected to extend over pauses between words uttered by the attendant. After the attendant stops speaking and the period set by the delay circuit 64, the signal T/L goes low at time t=T3, disabling the talk channel 22 and enabling the listen channel 20, thereby initiating a listen mode.

The listen mode is initiated by signal M from the multivibrator 72, which is triggered by signal T/L going low. When signal M goes high, it causes gain controller 38 to switch the gain of amplifier from a low value of, for example 30%, to 100%. (During period T1<L<T3, the gain of AGC 38 is immaterial since the LISTEN channel is off). The signal M remains high for a predetermined time, for example, 30 seconds. During this time the gain of amplifier 38 remains high thus allowing the attendant to hear the customer loud and clear. The duration DL of the listen mode is preselected to be long enough to allow a customer to complete his sentence. For example, as shown in FIG. 2, signal 92 indicating voice signals from the customer is expected to terminate prior to duration DL. Alteratively, the circuitry could be made so period DL is not fixed, but instead it terminates a preselected time after the customer stops talking. At the end of the listen period, i.e. at t=T4, the signal M goes low, causing the gain of controller 38 to fall back to 30%. In this manner, the system 10 reverts to the quiescent mode.

If desired, the muting of the listen channel can be disabled by turning manual switch 74 on. This switch then sets the gain of amplifier 36 to 100% independently of the operation of the multivibrator 72.

Although the invention has been described with reference to several particular embodiments, it is to be understood that these embodiments are merely illustrative of the application of the principles of the invention. Accordingly, the embodiments described in particular should be considered exemplary, not limiting, with respect to the following claims.

I claim:

1. A bidirectional communication system for providing communication between two points, said system comprising:

a listen channel including a listen microphone, a listen speaker and listen amplification means for transferring signals from said listen microphone to said listen speaker at one of a first and a second gain to reproduce sounds from said listen microphone at a corresponding first and second volume, said first gain being lower than said second gain;

a talk channel including a talk microphone, a talk speaker and talk means for transferring signals from said talk microphone to said talk speaker; and control means for controlling said listen channel, said control means including talk sensing means for sensing talk signals in said talk channel, said control means selecting said first gain under quiescent conditions, and said second gain after said talk signal has been sensed.

2. The system of claim 1 wherein said control means includes mode defining means for defining a talk mode initiated when said talk signals are sensed, and a listen mode succeeding said talk mode, said listen channel being set to said second gain during said listen mode.

3. The system of claim 1 further comprising inhibiting means for selectively inhibiting said listen channel when said talk signals are sensed.

4. The system of claim 1 further comprising inhibiting means for inhibiting said talk channel when said talk signals are not sensed.

5. A communication system for exchanging voice signals across a sound proof barrier defining an outer area and an inner area, said system comprising:

a listen channel having a listen microphone in said outer area, a listen speaker in said inner area, and listen amplifier means for transmitting listen signals from said listen microphone to said listen speaker at one of a high and a low gain to reproduce voice signals from said listen microphone at one of a respective first and second volume;

a talk channel including a talk microphone disposed in said inner area, a talk speaker disposed in said outer area and talk amplifier means for transmitting talk signals from said talk microphone to said talk speaker; and control means including means for sensing talk signals and means for setting said listen channel to said high gain in response to said talk signals, and for setting said listen channel to said low gain a period of time subsequent to said talk signals.

6. The system of claim 5 wherein said control means includes means for defining a talk mode when said talk signals are sensed, and means for defining a listen mode subsequent to said talk mode, wherein said listen channel is set to said high gain during said listen mode.

7. The system of claim 6 wherein said control means includes mens for defining a quiescent mode, wherein said listen channel is set to said low gain in said quiescent mode.

8. The system of claim 7 further comprising inhibiting means for inhibiting said listen channel in said talk mode, and said talk channel in said listen mode.

9. The system of claim 5 wherein said control means includes means for generating a timing signal extending a first predetermined period after said talk signals have terminated.

10. The system of claim 9 wherein said first period is about 200 msec.

11. The system of claim 5 further comprising means for generating a command signal after said talk signals have terminated, said command signal setting said listen channel to said high gain.

12. The system of claim 11 wherein said command signal has a predetermined duration.

13. The system of claim 12 wherein said duration is about 20–60 seconds.

14. The system of claim 12 wherein said duration is about 30 seconds.

15. The system of claim 5 further comprising control inhibit means for inhibiting said control means wherein said listen channel is set to said high gain when said inhibit means is activated.

16. The system of claim 15 wherein said inhibit means is a manual switch.

* * * * *